United States Patent
Gross et al.

(10) Patent No.: US 7,668,549 B2
(45) Date of Patent: Feb. 23, 2010

(54) METHOD AND SYSTEM FOR HANDLING SOFT HANDOFF IN A WIRELESS COMMUNICATION SYSTEM

(75) Inventors: Jonathan H. Gross, Gilbert, AZ (US);
Mark T. Pflum, Chandler, AZ (US);
Dean E. Thorson, Grayslake, AZ (US);
Joseph A. Tobin, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 285 days.

(21) Appl. No.: 11/427,025

(22) Filed: Jun. 28, 2006

(65) Prior Publication Data

US 2008/0004026 A1    Jan. 3, 2008

(51) Int. Cl.
*H04W 36/00* (2006.01)

(52) U.S. Cl. .................. 455/442; 455/436; 455/438; 455/439; 370/331

(58) Field of Classification Search .............. 455/442, 455/436, 438, 439; 370/331
See application file for complete search history.

(56) References Cited

U.S. PATENT DOCUMENTS

| 5,406,615 | A | 4/1995 | Miller, II et al. |
| 5,428,816 | A | 6/1995 | Barnett et al. |
| 5,465,389 | A | 11/1995 | Agrawal et al. |
| 6,131,029 | A | 10/2000 | Roberts |
| 6,628,949 | B1 * | 9/2003 | Park ........................ 455/436 |
| 7,099,672 | B2 | 8/2006 | Ma et al. |
| 2001/0043578 | A1 | 11/2001 | Kumar et al. |
| 2006/0229073 | A1 * | 10/2006 | Das et al. ................... 455/436 |

* cited by examiner

*Primary Examiner*—Nghi H Ly

(57) ABSTRACT

The present invention relates to a method and a system for handling one or more soft handoff (SHO) requests from one or more mobile stations in a wireless communication system. The method comprises determining a set of parameters corresponding to each SHO request corresponding to each mobile station. The method further comprises processing each SHO request corresponding to each mobile station based on the set of parameters corresponding to each SHO request.

15 Claims, 2 Drawing Sheets

METHOD AND SYSTEM FOR HANDLING SOFT HANDOFF IN A WIRELESS COMMUNICATION SYSTEM

FIELD OF INVENTION

The present invention relates generally to wireless communication systems. More specifically, the present invention relates to a method and a system for handling one or more soft handoff (SHO) requests from one or more mobile stations in a wireless communication system.

BACKGROUND OF THE INVENTION

Conventional wireless communication systems comprise multiple base stations. Each base station in the wireless communication system facilitates communication between a plurality of mobile stations in a cell. For instance, a mobile station can communicate with other end user devices through a base station corresponding to the cell.

When a mobile station roams from one cell to another, the mobile station is generally served by multiple base stations corresponding to the cells. As a result, while roaming, the communication of the mobile station with other mobile stations can be handled by multiple base stations. Handling of the communication of the mobile station by multiple base stations involves a process of handoff. The process of handoff is, basically, transferring the responsibility for the communication of the mobile station from one base station to another base station. In some of the existing technologies, if a handoff request from a mobile station is already in progress, and a new handoff request from the mobile station is received, the new handoff request can either be discarded or it can be buffered. The mobile station can resend its handoff request after the existing handoff request is processed completely. Handoff requests are conventionally processed and evaluated in First-in First-Out (FIFO) order requiring a current handoff of a mobile station to be complete prior to initiating a next handoff processing of the mobile station. As a result such requests are processed sequentially, therefore adding an additional latency while processing.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Figure 1:
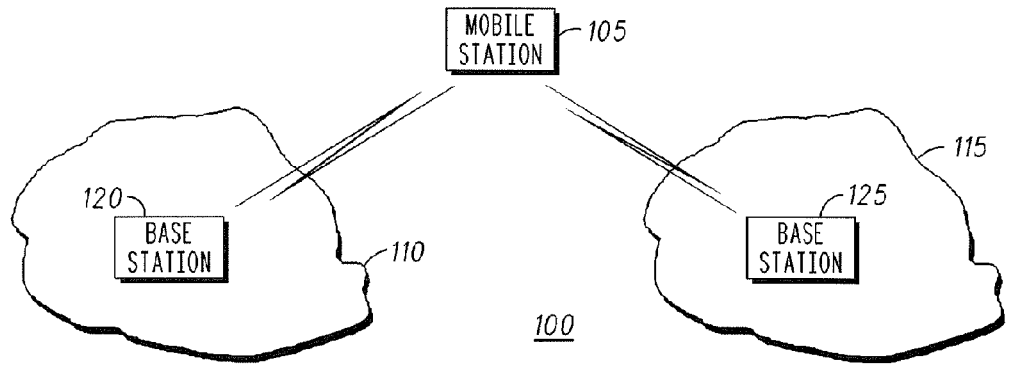
FIG. 1 illustrates a block diagram showing an exemplary environment in which various embodiments of the present invention can function.

Before describing in detail embodiments that are in accordance with the present invention, it should be observed that the embodiments reside primarily in combinations of method steps and apparatus components related to a method and system for handling one or more soft handoff (SHO) requests from one or more mobile stations in a wireless communication system. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the present invention described herein may be comprised of one or more conventional processors and unique stored program instructions that control the one or more processors to implement, in conjunction with certain non-processor circuits, some, most, or all of the functions of a method and system for handling one or more soft handoff (SHO) requests from one or more mobile stations in a wireless communication system. The non-processor circuits may include, but are not limited to, a radio receiver, a radio transmitter, signal drivers, clock circuits, power source circuits, and user input devices. As such, these functions may be interpreted as steps of a method to provide cordless extension for a plurality of communication devices in a defined environment described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, the present invention provides a method and a system that handles one or more handoff requests from one or more mobile stations in a wireless communication system. The wireless communication system can be, for instance, an Evolution Data Optimized (EVDO) system or a 1X system. Those skilled in the art will appreciate that a handoff between two base stations in a wireless communication system can be of two types; a hard handoff (HHO) and a soft handoff (SHO). In case of a HHO, association of a mobile station with its old base station is terminated before the mobile station is associated to a new base station. Also, a HHO can occur while the mobile station is in the process of establishing an association to a new base station. In case of SHO, the mobile station associates with one or more new base stations before terminating the association with the old base station. Specifically, if a mobile station is associated with one ore more base stations simultaneously during a handoff, the handoff is referred to as a SHO.

The present invention provides a method for evaluating one or more SHO requests in real time even when another SHO request is being processed. Based on the evaluation, the one or more SHO requests can be prioritized and can be executed accordingly. Those skilled in the art will realize that the above recognized advantages and other advantages described herein are merely exemplary and are not meant to be a complete rendering of all of the advantages of the various embodiments of the present invention.

Referring now to the drawings and in particular to FIG. 1, a block diagram showing an exemplary wireless communication system 100 is shown, in accordance with an embodiment of the present invention. The wireless communication system 100 comprises a mobile station 105 roaming between a defined environment 110 and a defined environment 115. The mobile station 105 can be, for example, a mobile phone, a laptop or a personal digital assistant (PDA). The defined environment 110 can have a base station 120 that handles communications for a plurality of mobile stations in the defined environment 110. Similarly, the defined environment 115 can have a base station 125 that handles communications for a plurality of mobile stations in the defined environment 115. Those skilled in the art will realize that the defined environment 110 and the defined environment 115 can be a coverage area of the base station 120 and the base station 125 respectively, or the defined environment 110 can be a cell. Moreover, there can be more than one base station serving a plurality of mobile stations in the defined environment 110 and the defined environment 115. Those skilled in the art, however, will recognize and appreciate that the specifics of this illustrative example are not specifics of the present invention itself and that the teachings set forth herein are applicable in a variety of alternative settings. For example, since the teachings described do not depend on the number or type of mobile stations, base stations and defined environments, they can be applied to any number or any type of mobile stations, base stations and defined environments although only one mobile station roaming between two defined environments where each defined environment comprises only one base station each, are shown in this embodiment.

Referring back to the embodiment depicted in FIG. 1, in an exemplary situation, the mobile station 105 is initially associated with the base station 120. Thus, the base station 120 facilitates communication of the mobile station 105 with a plurality of other mobile stations in the wireless communication system 100. Now, the mobile station 105 can be in a communication session with another mobile station, for example, the mobile station 105 can be participating in an ongoing telephonic call. During the ongoing telephonic call, if the mobile station 105 roams out from the defined environment 110, the mobile station 105 can still be soft associated with the base station 120. Simultaneously, when the mobile station enters the defined environment 115, the mobile station 105 can request for a soft association with the base station 125. This request for a soft association is known as a SHO add. The mobile station 105 can, then, drop its soft association with the base station 120. This dropping of soft association is known as a SHO drop.

The mobile station 105 may not drop its soft association with the base station 120 until the mobile station 105 is not soft associated with the base station 125. This ensure that the mobile station 105 does not lose connectivity with the wireless communication system 100. For example, the mobile station 105 may wish to soft associate with the base station 125, which can have a high quality Radio Frequency (RF) link, and disassociate with the base station 120, which can have a low quality RF link. Consequently, the mobile station 105 sends a SHO add request for the base station 125 and a SHO drop request for the base station 120. However, if the SHO drop request of the mobile station 105 for the base station 120 is in progress, the soft association of the mobile station 105 with the base station 125 may not get executed or may get delayed. In this case, the soft association of the mobile station 105 with the base station 120 may fail prior to being able to successfully establish the soft association with the base station 125. In order to avoid this situation, in accordance with the present invention, SHO requests from a mobile station are prioritized. Specifically, a SHO add request is prioritized above a SHO drop request.

Figure 2:
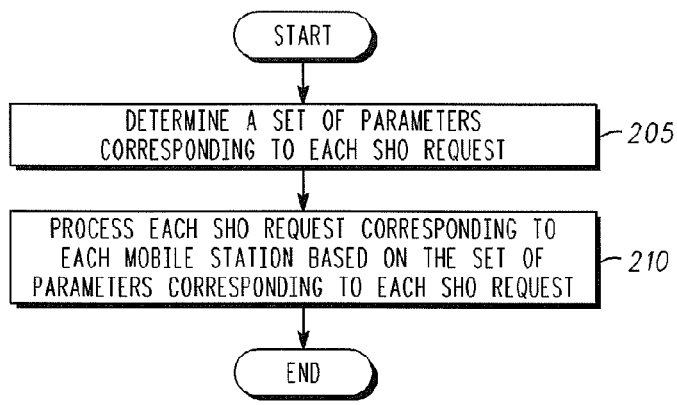
FIG. 2 illustrates a flow diagram of a method for handling at least one soft handoff (SHO) request from at least one mobile station in a wireless communication system in accordance with an embodiment of the present invention.

Turning now to FIG. 2, a flow diagram of a method for handling at least one soft handoff (SHO) request from at least one mobile station in a wireless communication system is shown in accordance with an embodiment of the present invention. Those skilled in the art will realize that a SHO request can be a Pilot Strength Measurement Message (PSMM) if the wireless communication system is a 1x system. The SHO request can be a Route Update message if the wireless communication system is an EVDO system. In the wireless communication system a plurality of mobile stations travel in various defined environments also know as cells. As stated earlier, the defined environments where the mobile stations travel may have a plurality of base stations. Handling communication for a mobile station by the plurality of base stations involves a process of handoff. The process of handoff is transferring the responsibility for the communication of the mobile station from one base station to another base station.

At the time of SHO, communication with one or more new base stations is established before terminating communication with the old base station. Essentially, a mobile station is in communication with one or more base stations simultaneously during the SHO. Also, mobile station can send multiple SHO requests, for instance a SHO add request to associate with a new base station and a SHO drop request to disassociate with a current base station. For example, a mobile station, which is roaming out from a defined environment corresponding to a base station, can send a SHO drop request for disassociating with the base station. Simultaneously, the mobile station, which is roaming into another defined environment corresponding to a new base station, can send a SHO add request for the new base station. Those skilled in the art will realize that these base stations comprise an active set, a candidate set and a discard set. The active set is a set of base stations that are involved with the mobile station during the SHO. The a candidate set is a set of base stations that are neighboring base stations to the active set and the discard set is a set of base stations that are the base stations that are currently members of the active set but will be dropped because they are no longer qualified as such. In an embodiment of the present invention, where the wireless communication system is a 1x system, the SHO request, which is a PSMM, allows the mobile station to indicate pilot strengths of the active set and the candidate set. The PSMM can also have indicators or flags that indicate if a base station is to be dropped from either the active set or the candidate.

In accordance with the present invention, the one or more SHO requests received from one or more mobile stations are prioritized. Initially, when one or more SHO requests corresponding to one or more mobile station are received, a set of parameters corresponding to each SHO request corresponding to each mobile station is determined, at step 205. In an embodiment of the present invention, the set of parameters can comprise a request-type corresponding to a SHO request. The request-type corresponding to a SHO request sent by a mobile station can be a SHO add request or a SHO drop request. The SHO request can comprise pilot strength measurements corresponding to the mobile station. The pilot strength measurements enable the base station to determine a signal strength corresponding to the mobile station. In an embodiment of the present invention the mobile station can send multiple SHO requests of different types. Those skilled in the art will recognize that these multiple SHO requests can be separated and processed independently. Each SHO request is, then, processed at step 210 based on the set of parameters corresponding to each SHO request. The processing step is described in detail in FIG. 3.

Upon processing one or more SHO requests received, one of the SHO requests from the plurality of SHO requests is prioritized. If an in-progress SHO request is assigned a lower priority than a new SHO request received, the in-progress SHO request is preempted and the new SHO request is executed.

Those skilled in the art will recognize that the latency involved while processing the SHO requests sequentially and in First-in First-Out order is reduced as the incoming SHO requests are prioritized in real-time in the wireless communication system. In an embodiment of the present invention, a mobile station sends a SHO add request for other base stations as well if a pilot signal of the base stations, as indicated by the SHO add request, exceeds a threshold. The other base stations can also be included in the active set of the mobile station.

Figure 3:
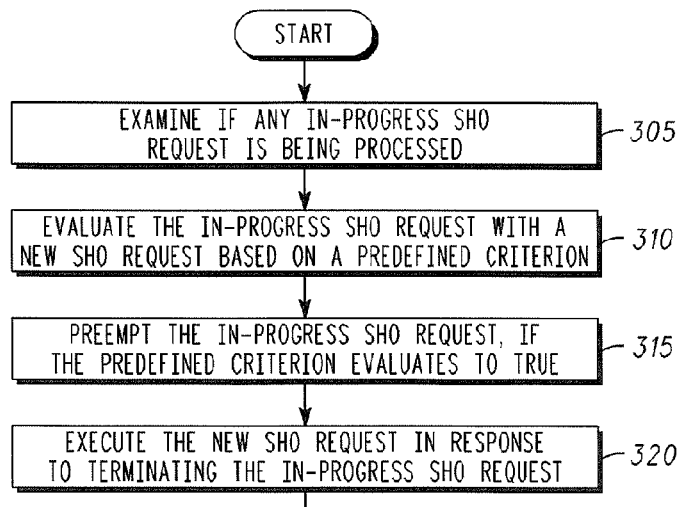
FIG. 3 illustrates a flow diagram of a method for processing at least one SHO request from at least one mobile station in a wireless communication system in accordance with another embodiment of the present invention.

Turning now to FIG. 3, a flow diagram of a method of processing a new SHO request corresponding to a mobile station is shown in accordance with an embodiment of the present invention. The method of FIG. 3 elaborates on the step 210 of FIG. 2. When the new SHO request from the mobile station is received, it is examined at step 305 if an in-progress SHO request is being processed. If there is no in-progress SHO request that is being processed, then the new SHO request is processed normally, as is done in conventional methods. If an in-progress SHO request is being processed, the new SHO request is evaluated with the in-progress SHO request based on a predefined criterion, at step 310.

In an embodiment of the present invention, the predefined criterion can be the in-progress SHO request being a SHO drop request from the mobile station and the new SHO request being an SHO add request from the mobile station. Those skilled in the art will realize that the SHO add request is a request for a base station to be added to an active set of the mobile station and SHO drop request is a request for a base station to be dropped from the active set of the mobile station. The in-progress SHO request is preempted at step 315 if the predefined criterion evaluates to true, for instance if the in-progress SHO request is the SHO drop request and the new SHO request is the SHO add request, the in-progress SHO request is preempted.

In another embodiment of the present invention, the predefined criterion can be the in-progress SHO request being a SHO add request from the mobile station and the new SHO request also being a SHO add request from the mobile station. In this case, a pilot strength measurement corresponding to the new SHO add request is compared to a pilot strength measurement corresponding to the in-progress SHO add request. If the pilot strength measurement corresponding to the new SHO add request is stronger than the pilot strength measurement corresponding to the in-progress SHO add request, the in-progress SHO add request is preempted and the new SHO add request is processed at step 315. This reduces undesirable latency while processing a new SHO add request having a strong pilot strength measurement indicating a high quality Radio Frequency (RF) link. On the other hand, if the pilot strength measurement corresponding to the new SHO add request is weaker than the pilot strength measurement corresponding to the in-progress SHO add request, then the new SHO add request is placed in a queue and is processed only after the in-progress SHO add request is completely processed. Thus, a base station corresponding to the in-progress SHO add request may get added to an active set of the mobile station before a base station corresponding to the new SHO add request is added. This ensures that a base station corresponding to a SHO request with a strongest pilot strength measurement is added to an active set of the mobile station.

The preempting step, step 315, can comprise ceasing transmission of a handoff response corresponding to the in-progress SHO request to the mobile station. The handoff response can be a traffic channel assignment (TCA), if the wireless communication system is an EVDO system, or a handoff direction message (HDM), if the wireless communication system is 1X system. At step 320, the new SHO request is executed in response to preempting the in-progress SHO request. The executing step 320 involves transmitting the handoff response to the mobile station corresponding to the new SHO request.

In an embodiment of the present invention if the predefined criterion evaluates to false, for instance if the in-progress SHO request is not preempted, then one or more new SHO requests are enacted upon in a predefined order. The one or more SHO requests can be arranged in the predefined order based on the request-type of each SHO request and the pilot strength measurement corresponding to each SHO request. Moreover, an SHO add request from a mobile station is given a higher priority than a SHO drop request from the mobile station. For example, two SHO add requests can be received from a mobile station to associate with two base stations. However, an in-progress SHO add request from the mobile station can have a pilot strength measurement stronger than the two SHO add request. In this case, the in-progress SHO add request is not preempted. However, the pilot strength measurements of the two SHO add requests are compared. The SHO add request from the two SHO add requests, that has a stronger pilot strength measurement is queued to be processed first.

Figure 4:
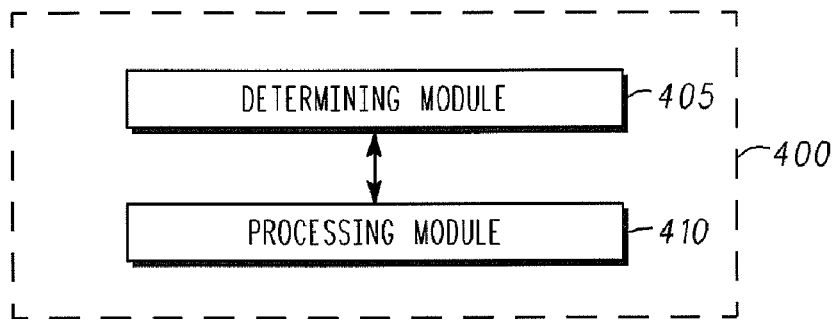
FIG. 4 illustrates a block diagram showing various modules of a system handling at least one SHO request from at least one mobile station in a wireless communication system in accordance with an embodiment of the present invention.

Turning now to FIG. 4, a block diagram of a system 400 for handling one or more soft handoff (SHO) requests from one or more mobile stations in a wireless communication system is shown in accordance with an embodiment of the present invention. The system 400 can reside on a base station, on a fixed network equipment or on a central controller in a defined environment. The system 400 comprises a determining module 405 and a processing module 410. The determining module 405 determines a set of parameters corresponding to each SHO request corresponding to each mobile station. The set of parameters can comprise a request-type corresponding to a SHO request or a pilot strength measurement corresponding to a SHO request. The request-type corresponding to a SHO request sent by a mobile station can be a SHO add request or a SHO drop request. The SHO request for a base station can comprise the pilot strength measurement. The pilot strength measurement enables determination of a signal strength corresponding to RF link between the base station and the mobile station.

Having determined the set of parameters corresponding to each SHO request, the processing module 410 processes each SHO request based on the set of parameters. Various modules of the processing module 410 are described in detail in FIG. 5. After one or more SHO requests are processed by the processing module 410, the plurality of SHO requests from the mobile station are prioritized. If an in-progress SHO request is assigned a lower priority than a new SHO request received, the in-progress SHO request is preempted and the new SHO request is executed.

Figure 5:
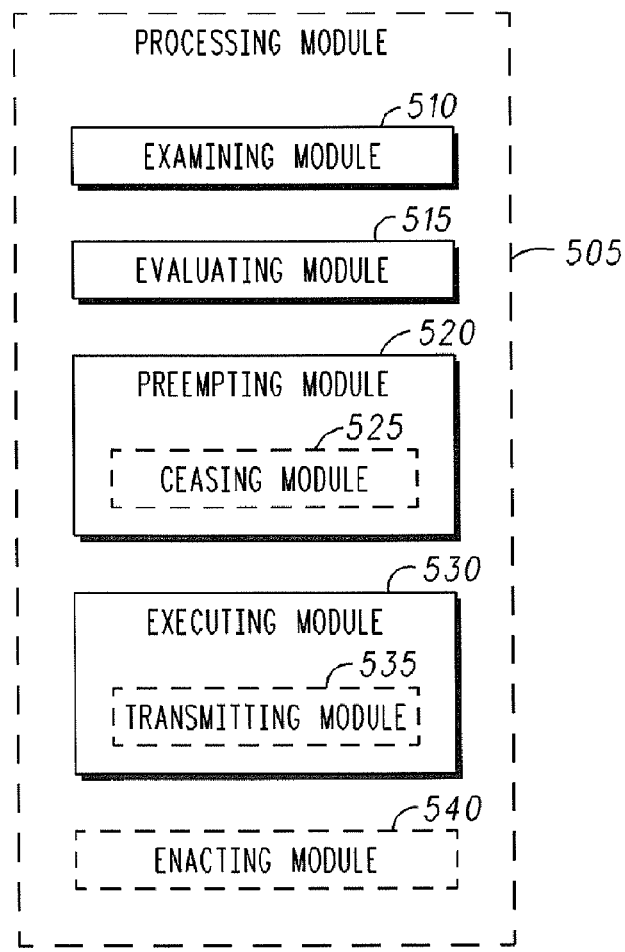
FIG. 5 illustrates a block diagram showing various modules in a processing module, in accordance with an embodiment of the present invention.

Turning now to FIG. 5, a block diagram depicting a processing module 505 is shown in accordance with an embodiment of the invention. The processing module 505 is the processing module 410 mentioned in FIG. 4. The processing module 505 processes one or more SHO requests from a mobile station for one or more base stations based on a set of parameters.

Once a set of parameters corresponding to each SHO request is determined, an examining module 510 examines if an in-progress SHO request from the mobile station is being processed. In case the in-progress SHO request is being processed an evaluating module 515 evaluates the in-progress SHO request with a new SHO request from the mobile station based on a predefined criterion. As mentioned earlier, in an embodiment of the present invention, the predefined criterion can be the in-progress SHO request being a SHO drop request from the mobile station to disassociate with a current base station and the new SHO request being an SHO add request from the mobile station to associate with a new base station. A preempting module 520 preempts the in-progress SHO request if the evaluating module 515 evaluates the predefined criterion to be true, for instance if the evaluating module 515 evaluates that the in-progress SHO request is the SHO drop request and the new SHO request is the SHO add request, the preempting module 520 preempts the in-progress SHO request.

In another embodiment of the present invention, the predefined criterion can be the in-progress SHO request being the SHO add request and the new SHO request also being the SHO add request from the mobile station. In this case, the evaluating module 515 compares a pilot strength measurement corresponding to the new SHO add request with a pilot strength measurement corresponding to the in-progress SHO add request. If the pilot strength measurement corresponding to the new SHO add request is stronger than the pilot strength measurement corresponding to the in-progress SHO add request, the preempting module 520 preempts the in-progress SHO add request and the new SHO add request is processed. This reduces undesirable latency while processing a new SHO add request having a strong pilot strength measurement. On the other hand, if the pilot strength measurement corresponding to the new SHO add request is weaker than the pilot strength measurement corresponding to the in-progress SHO add request, then the new SHO add request is placed in a queue and is processed only after the in-progress SHO add request is completely processed. Thus, a base station corresponding to the in-progress SHO add request may get added to an active set of the mobile station before a base station corresponding to the new SHO add request is added. This ensures that a base station corresponding to a SHO request with a strongest pilot strength measurement is added to an active set of the mobile station.

The preempting module 520 can comprise a ceasing module 525. If the in-progress SHO request is to be preempted, the ceasing module 525 ceases transmission of a handoff response corresponding to the in-progress SHO request to the mobile station. The handoff response can be a traffic channel assignment (TCA), if the wireless communication system is an EVDO system, or a handoff direction message (HDM), if the wireless communication system is a 1x system. Additionally, an executing module 530 executes the new SHO request in response to preempting the in-progress SHO request. The executing module 530 further comprises a transmitting module 535 that transmits the handoff response corresponding to the new SHO request to the mobile station.

In an embodiment of the present invention, the processing module 505 comprises an enacting module 540. The enacting module 540 enacts on one or more new SHO requests in a predefined order, if the predefined criterion evaluates to false, for instance, if the in-progress SHO request is not preempted. In this situation the one or more new SHO requests are placed in a queue and are processed only after the in-progress SHO request is completely processed. The one or more new SHO request are arranged in the predefined order in the queue based on the request-type of each SHO request and the pilot strength measurement corresponding to each SHO request. Moreover, each SHO add request from a mobile station is given a higher priority than a SHO drop request from the mobile station, thereby reducing undesirable latency while processing a new SHO add request having strong pilot signals. Therefore, the system prioritizes the incoming pilot strength measurement in real-time in the wireless communication system in order to reduce latency while processing a critical pilot strength measurement.

The various embodiments of the present invention provide a method and a system that handles one or more soft handoff (SHO) requests from one or more mobile stations in a wireless communication system. Further, the present invention provides a method of evaluating and prioritizing the one or more SHO requests from a mobile station, so that a SHO request with a higher priority is executed first. The SHO requests are prioritized based on a set of parameters. The set of parameters can comprise a request-type corresponding to a SHO request or a pilot strength measurement corresponding to a SHO request. Those skilled in the art will realize that there is a direct relationship between handoff latency for SHO add requests and dropped calls. Thereby undesirable latency is reduced while processing a SHO add request with a strong pilot strength measurement, as the system prioritizes the incoming SHO add request in real-time in the wireless communication system. Moreover, the present invention facilitates a mobile station to obtain an optimized active set. The optimized active set can comprise base stations with high quality RF links. Dropped calls can be reduced by achieving the optimized active set quickly. Also, an improved throughput and Frame Error Rate (FER) is obtained from this optimized active set. Additionally, the present invention provides a critical performance metric for wireless communication systems, such as cellular systems. Also, a high customer visibility is achieved.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for handling at least one soft handoff (SHO) request from at least one mobile station in a wireless communication system, the method comprising:
   receiving a incoming SHO request at a base station sent from the at least one mobile station at a base station;
   determining a set of parameters of the received SHO request;
   prioritizing the received SHO request with an in-progress SHO being performed by the base station based on the set of parameters corresponding to each SHO request;
   processing the prioritized SHO request corresponding to each mobile station based on the set of parameters corresponding to each SHO request, and
   wherein the prioritizing step comprises:
      examining if an in-progress SHO request is being present, wherein an in-progress SHO request is a SHO request that is being processed;
      evaluating the in-progress SHO request with a new SHO request based on a predefined criterion;
      preempting the in-progress SHO request, if the predefined criterion evaluates to true; and
      executing the new SHO request in response to preempting the in-progress SHO request.

2. The method of claim 1, wherein the set of parameters comprising at least one of:
   a request-type corresponding to a SHO request, wherein a request-type corresponding to a SHO request can be one of a SHO add request and a SHO drop request; and
   a pilot strength measurement corresponding to a SHO request.

3. The method of claim 1, wherein the predefined criterion comprises one of:
   an in-progress SHO request being a SHO drop request and a new SHO request being an SHO add request; and
   an in-progress SHO request being a SHO add request and a new SHO request being an SHO add request, wherein a pilot strength measurement corresponding to the new SHO request being stronger than a pilot strength measurement corresponding to the in-progress SHO request.

4. The method of claim 1, wherein the preempting step comprises:
   ceasing transmission of a handoff response to a mobile station for the in-progress SHO request, wherein the handoff response comprises one of a traffic channel assignment (TCA) and a handoff direction message (HDM).

5. The method of claim 1, wherein the executing step comprises:
   transmitting a handoff response to a mobile station for the new SHO request.

6. The method of claim 1, further comprising:
   enacting on the new SHO request in a predefined order, if the predefined criterion evaluates to false, wherein the at least one SHO request are arranged in the predefined order based on the request-type of each SHO request and the pilot strength measurement corresponding to each SHO request, wherein each SHO add request is given a high priority than a SHO drop request.

7. A system for handling at least one soft handoff (SHO) request from at least one mobile station in a wireless communication system, the system comprising:
   a determining module, the determining module determining a set of parameters corresponding to each SHO request received each mobile station; and
   a processing module, the processing module processing each SHO request corresponding to each mobile station by prioritizing the received SHO request with a an in-progress SHO request based on the set of parameters corresponding to each SHO request and wherein the processing module comprises an examining module, the examining module examining if an in-progress SHO request is being present, wherein an in-progress SHO request is a SHO request that is being processed; an evaluating module, the evaluating module evaluating the in-progress SHO request with a new SHO request based on a predefined criterion; a preempting module, the preempting module preempting the in-progress SHO request, if the predefined criterion evaluates to true; and an executing module, the executing module executing the new SHO request in response to preempting the in-progress SHO request.

8. The system of claim 7, wherein the preempting module comprises:
   a ceasing module, the ceasing module ceasing transmission of a handoff response to a mobile station for the in-progress SHO request, wherein the handoff response comprises one of a traffic channel assignment (TCA) and a handoff direction message (HDM).

9. The system of claim 7, wherein the executing module comprises:
   a transmitting module, the transmitting module transmitting the handoff response to a mobile station for the new SHO request.

10. The system of claim 7, further comprising:
    an enacting module, the enacting module enacting on the new SHO request in a predefined order, if the predefined criterion evaluates to false, wherein the at least one SHO request are arranged in the predefined order based on the request-type of each SHO request and the pilot strength measurement corresponding to each SHO request, wherein each SHO add request is given a high priority than a SHO drop request.

11. A method for evaluating a soft handoff (SHO) request from received from a mobile station in a wireless communication system, the method comprising:

receiving a new SHO request at a base station from the mobile station;

evaluating the new SHO request to determine a set of parameters for the new SHO request;

determining if an in-progress SHO request is being processed;

if an in-progress SHO request is being processed, evaluating the in-progress SHO request to determine a set of parameters for the in-progress SHO request, and prioritizing the new SHO request with the in-progress SHO request based on the predefined criterion using set of parameters for each of the new SHO request and the in-progress set of parameters wherein the prioritizing step comprises evaluating the in-progress SHO request with the new SHO request based on the predefined criterion; preempting the in-progress SHO request, if the predefined criterion evaluates to true; and executing the new SHO request in response to preempting the in-progress SHO request.

12. The method of claim 11 wherein the predefined criterion of the new SHO request and the in-progress SHO request being one of an SHO add request, an SHO drop request and a pilot strength measurement of the mobile station.

13. The method of claim 12 wherein the step of prioritizing prioritizes the new SHO request over the in-progress SHO request when the new SHO request is the SHO add request and the in-progress SHO request is a drop request.

14. The method of claim 12 wherein the step of prioritizing uses the pilot strength measurement of the new SHO request and the in-progress SHO request to prioritize the new SHO request when the new SHO request is an SHO add request and the in-progress SHO request is an SHO add request.

15. The method of claim 12 wherein the step of prioritizing prioritizes the in-progress SHO request over the new SHO request when the new SHO request is the SHO drop request and the in-progress SHO request is the SHO add request.

* * * * *